(12) United States Patent
Man

(10) Patent No.: US 6,403,013 B1
(45) Date of Patent: Jun. 11, 2002

(54) METHOD FOR PRODUCING A DRIP IRRIGATION LINE

(75) Inventor: Chen Man, Kibbutz Merchavia (IL)

(73) Assignee: Plassin Technical Plastics Works for Agriculture, Industry and Building Ltd., Kibbutz Merchavia (IL)

( * ) Notice: Subject to any disclaimer, the term of this patent is extended or adjusted under 35 U.S.C. 154(b) by 0 days.

(21) Appl. No.: 09/565,403

(22) Filed: May 5, 2000

(30) Foreign Application Priority Data

May 6, 1999 (IL) .................................................. 129817

(51) Int. Cl.$^7$ ........................... B29C 71/04; B05B 15/00
(52) U.S. Cl. ............. 264/477; 264/171.11; 264/211.13; 264/347
(58) Field of Search ........................... 264/477, 171.11, 264/171.12, 177.17, 211.12, 211.13, 347; 239/542

(56) References Cited

U.S. PATENT DOCUMENTS

| | | | | |
|---|---|---|---|---|
| 4,210,287 A | * | 7/1980 | Mehoudar | 239/109 |
| 4,728,042 A | * | 3/1988 | Gorney et al. | 239/542 |
| 4,824,025 A | * | 4/1989 | Miller | 138/43 |
| 5,022,940 A | * | 6/1991 | Mehoudar | 156/244.13 |
| 5,122,044 A | * | 6/1992 | Mehoudar | 264/210.1 |
| 5,163,622 A | * | 11/1992 | Cohen | 239/542 |
| 5,203,503 A | * | 4/1993 | Cohen | 239/1 |
| 5,271,786 A | * | 12/1993 | Gorney et al. | 239/533.13 |
| 5,279,462 A | * | 1/1994 | Mehoudar | 239/533.13 |
| 5,294,058 A | * | 3/1994 | Einav | 138/45 |
| 5,324,371 A | * | 6/1994 | Mehoudar | 156/244.13 |
| 5,324,379 A | * | 6/1994 | Eckstein | 156/244.13 |
| 5,330,107 A | * | 7/1994 | Karathanos | 138/43 |
| 5,443,212 A | * | 8/1995 | Dinur | 239/542 |
| 5,586,727 A | * | 12/1996 | Shekalim | 239/542 |
| 5,591,293 A | * | 1/1997 | Miller | 156/203 |
| 5,813,603 A | * | 9/1998 | Kurtz | 239/1 |
| 6,308,902 B1 | * | 10/2001 | Huntley | 239/1 |

FOREIGN PATENT DOCUMENTS

EP   0 444 425 A1 * 9/1991

* cited by examiner

Primary Examiner—Mark Eashoo
(74) Attorney, Agent, or Firm—Townsend and Townsend and Crew LLP

(57) ABSTRACT

The invention provides a method for producing a drip irrigation line, comprising a continuous tubing with spaced-apart drip outlets and a plurality of self-regulating emitter elements for drip irrigation arranged therein, wherein each of said elements is made from a thermoplastic material, injection-molded as a single unit, which material is cross-linked for improved elasticity, said method comprising sequentially introducing a plurality of said emitter elements at predetermined intervals into the extrusion head of a continuous tubing-producing extruder, whereby said elements are each heat-welded within said tubing before the cooling thereof and subsequently cross-linking said thermoplastic material of each of said elements while inside said continuous tubing.

6 Claims, No Drawings

METHOD FOR PRODUCING A DRIP IRRIGATION LINE

The present invention relates to a method for producing a drip irrigation line, containing a plurality of self-regulating flow-reducing element for drip irrigation.

Drip irrigation tubing is in widespread use for the delivery of water and fertilizer dissolved therein to the roots of plants requiring same. Drip irrigation saves water by reducing evaporation of water in comparison to spray irrigation. Furthermore, the water is delivered at a slow rate, allowing the plant to absorb the moisture before its loss, either through evaporation or through seepage into the soil below root level.

The water pressure within irrigation tubes can vary considerably. While the source of pressure variation can be dealt with by the installation of a suitable pressure control valve at the inlet point of the irrigation tube, larger variations which are difficult to control occur due to the length of a typical irrigation system. The pressure near the inlet point is certain to be considerably higher than pressure at the far end of a long tube.

Diaphragm type emitter units have been developed to meet the problems posed by line pressure variations. Such units are exposed to line pressure, so that high line pressure on a flexible diaphragm restricts a flow passage, while low pressure releases the diaphragm to allow full use of the flow passage, thus achieving a self-regulating flow that remains substantially constant at all pressures encountered during normal operation.

A further benefit of diaphragm-type emitters is their tendency to be self cleaning. Small solid particles entrapped in the flow path when restricted by the diaphragm at a time of high pressure will be cleared out by the fluid flow when pressure is reduced and the diaphragm is non-restrictive.

Drip irrigation emitters are described in the several US Patents.

U.S. Pat. No. 4,728,042 discloses a tube internally fitted with flow control inserts having an outer chamber extending over a significant portion of the tube circumference. The inserts include a pressure responsive flow controller, a pressure reducing pathway formed by the insert, and an air pocket spring defined by the insert for cooperation with a pressure responsive flow controller.

External emitters are described and claimed in U.S. Pat. No. 5,279,462, in U.S. Pat. No. 5,294,058 and in U.S. Pat. No. 5,443,212. These emitters use a diaphragm for pressure regulation, but flow direction is perpendicular to the tube axis, they have no labyrinth and as their form and assembly method is quite different from the internal type which is the subject of the present invention, these types of emitters need not be further discussed herein.

U.S. Pat. No. 5,330,107 discloses a drip irrigation system which comprises a water conduit and a series of cylindrical one-piece pressure compensating emitters inserted therein. Each emitter has a body of a flexible elastic material, inlet means being connected to a labyrinth flow passage defined between the outer periphery of the emitter body and the inner surface of the conduit. The flow passage passes through a deformable part of the emitter body opening into a peripheral channel leading to an orifice. The deformable part is acted on by water pressure and co-acts with the inner surface of the water conduit.

Each emitter is symmetrical about the peripheral channel in the middle of the emitter body length. Inlets, the flow passage, and a deformable part are located on each side of said channel.

U.S. Pat. No. 5,586,727 discloses a flow reducer device which includes a body member, assembled inside a conduit, having a flow regulating region formed with a cavity extending through the body member. The cavity is closed at its ends by a deformable diaphragm, preferably an elastomeric sleeve. Conduit water pressure causes the sides of said sleeve to be deformed towards or away from each other in order to regulate flow. The emitter is a three-part assembly-inlet, diaphragm tube and outlet.

Furthermore, many previous emitters have a separate diaphragm and a separate cover to hold said diaphragm to an emitter body, which greatly increases the assembly and manufacturing cost of such emitters.

In U.S. Pat. No. 4,824,025 there is described and claimed a one-piece in-line pressure compensating drip irrigation emitter, comprising an emitter body of flexible elastic material, having a plurality of inlet means in communication with the interior of the conduit line and deformable flow regulating means including a tubular member diametrically transvering the cylinder of the irrigation emitter unit, however said patent is limited to cylindrical emitter units which are adapted to be inserted in a tubular fluid-carrying conduit line which forms an outer sleeve around said emitter unit, as seen in FIGS. 1 and 2 of said patent and in which the emitter body is provided with a plurality of inlet means necessitated by the fact that it is totally surrounded by the conduit line.

U.S. Pat. No. 5,203,503, corresponding to Israel patent 93,255, describes and claims a drip irrigation line comprising:

a continuous tube having a plurality of flow-reducer elements spaced longitudinally of the tube;

each of said flow-reducer elements comprising a strip formed with an inlet chamber of a predetermined depth at one end having an inlet opening, an outlet chamber of said predetermined depth at the opposite end having an outlet opening, and a flow-reducer path between said two chambers;

said strip of each flow-reducer element being further formed with a connecting passageway, of a depth less than said predetermined depth, between, and axially spaced from said flow-reducer path and said outlet chamber;

said connecting passageway including a wide groove of a depth from the inner face of the tube less than that of said predetermined depth, and a narrow groove, of a depth from the inner face of the tube greater than that of said wide groove but less than that of said predetermined depth, extending through a part of said wide groove;

at least the portion of the strip forming said connecting passageway being of elastomeric material.

In U.S. Pat. No. 5,203,503 there is described the possibility of producing the flow-reducer elements from a plurality of different materials, injection-moulded during separate shots in a single mould, at least one of which materials is an elastomeric material, e.g., the flow-reducer element can be made of elastomeric material, while the remainder of the element is made of a non-elastomeric plastic materials, such as polyethylene or polypropylene.

Alternatively, each strip is of elastomeric material for the complete length of the flow-reducer path and of the connecting passageway, which enables the flow-reducer elements to be produced by a one-shot moulding operation.

In both cases, it is described that a plurality of the flow-reducer elements are first injection moulded onto the continuous strip and then the tube is extruded while concurrently feeding and bonding the continuous strip, and its flow-reducer elements to the inner face of the extruded tube.

In both of said patents and many other patents using the same technique of heat welding of the emitter units to the inner surface of the irrigation tube during the extrusion of the tube, little or no attention is directed to the attributes of the emitter to, on the one hand, assure effective heat welding to the continuous tubing, and on the other hand, to assure the existence of appropriate elastic properties in the emitter units.

It has now been discovered that drip irrigation lines of improved properties can be prepared by utilizing self-regulating emitter units made from a thermoplastic material, injection-moulded as a single unit, which material is cross-linked for improved elasticity, however in which said cross-linking is effected after the elements have been heat-welded within said tubing.

Thus, the present invention provides a method for producing a drip irrigation line, comprising a continuous tubing with spaced-apart drip outlets and a plurality of self-regulating emitter elements for drip irrigation arranged therein, wherein each of said elements is made from a thermoplastic material, injection-molded as a single unit, which material is cross-linked for improved elasticity, said method comprising:

a) sequentially introducing a plurality of said emitter elements at predetermined intervals into the extrusion head of a continuous tubing-producing extruder, whereby said elements are each heat-welded within said tubing before the cooling thereof; and b) subsequently cross-linking said thermoplastic material of each of said elements while inside said continuous tubing.

The expedient of heat welding emitter units to the inner surface of a conduit formed of a thermoplastic material such as polyethylene or the like has been known for more than twenty years in the industry, as described, e.g., in Israel Patent 53463.

Thus, the bonding of the emitter of U.S. Pat. No. 4,824,025 by heat welding to the internal circumferential surface of a conduit line at pre-determined spaced intervals is described in said patent, however said patent describes the entire emitter unit, including the transversal member, as being made of a single piece of flexible rubber, or other material having similar elastic properties.

Similarly, U.S. Pat. No. 5,330,107 refers to an emitter made of flexible material with elastic properties, but does not describe the material from said emitters are made.

In EP 0 444 425 there are described elements in the form of a strip, made of an elastomeric material, such as natural or synthetic rubber, thermoplastic elastomers (TPE), polyurethane, etc., however while the use of thermoplastic elastomers are contemplated by said patent, the use of a thermoplastic material which is cross-linked for improved elasticity is neither taught nor suggested in said patent, nor in any of the above-mentioned patents.

Furthermore, none of said prior art publications teach or suggest the cross-linking of the elastomeric material inside the irrigation tubing after the welding of the regulating units to the inner surface of said tubing, which is a critical feature of the method of the present invention, although at least partial cross-linking of the thermoplastic material of the emitter units before introduction into the tubing is also possible.

In preferred embodiments of the present invention said thermoplastic material is a polyolefinic material, and a preferred thermoplastic material is ethylene octene copolymer.

In an especially preferred embodiment of the present invention said thermoplastic material is a grafted silane ethylene octene copolymer.

Preferably, said thermoplastic material is cross-linked after the formation of said element, either by radiation, or when said thermoplastic material is a grafted silane ethylene octene copolymer in the presence of water in gaseous or liquid form.

The new manufacturing method of cross-linking the emitter polymer after its positioning in the tube and after said emitters have been heat-welded to the surface of the tube, whether cross-linking is by radiation, or by the use of water vapor, has major advantages over the prior art processes of manufacture since, while cross-linking produces an emitter having better elastomeric properties, the cross-linking of the polymer before introduction into the tubing complicates the process of attaching the same to the inner surface of the tubing. Thus, the present method achieves manufacturing advantages of allowing heat welding of the emitters to the tube during the extrusion process thereof, without sacrificing the advantage of having an emitter having improved elastomeric properties formed of a cross-linked polymer.

While the invention will now be described in connection with certain preferred embodiments in the following example so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following example which includes a preferred embodiment will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE

A mixture of ethylene-octene copolymer (98.2 wt./wt. %), vinyl trimethoxy silane (1.5 wt./wt. %), dicumyl peroxide (0.075 wt./wt. %), di-butyl tin dilaurate (0.025 wt./wt. %), and irganox 1330 (0.2 wt./wt. %), is injection molded into the form of an emitter.

Continuous polyethylene tubing is extruded from an extruder and said emitters are introduced through the extruder head of said tubing and heat-welded to an inner surface thereof before said tubing is cooled in the cooling bath.

The pipe is then exposed to a humid atmosphere to speed up the cross-linking of the emitter material, whereby a drip irrigation line is formed.

It will be evident to those skilled in the art that the invention is not limited to the details of the foregoing illustrative example and that the present invention may be embodied in other specific forms without departing from the essential attributes thereof, and it is therefore desired that the present embodiments and example be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for producing a drip irrigation line, comprising a continuous tubing with spaced-apart drip outlets and a plurality of self-regulating emitter elements for drip irrigation arranged therein, wherein each of said elements is made from a thermoplastic material, injection-molded as a single unit, which material is cross-linked for improved elasticity, said method comprising:
   a) sequentially introducing a plurality of said emitter elements at predetermined intervals into the extrusion head of a continuous tubing-producing extruder, whereby said elements are each heat-welded within said tubing before the cooling thereof; and
   b) subsequently cross-linking said thermoplastic material of each of said elements while inside said continuous tubing.

2. A method according to claim 1, wherein said thermoplastic material is a polyolefinic material.

3. A method according to claim 1, wherein said thermoplastic material is an ethylene octene copolymer.

4. A method according to claim 1, wherein said thermoplastic material is a grafted silane ethylene octene copolymer.

5. A method according to claim 4, wherein said cross-linking is effected in the presence of water in gaseous or liquid form.

6. A method according to claim 1, wherein said cross-linking is effected by radiation.

* * * * *